UNITED STATES PATENT OFFICE.

FLOYD J. METZGER, OF NEW YORK, N. Y., ASSIGNOR TO AIR REDUCTION COMPANY, INC., OF NEW YORK, N. Y., A CORPORATION OF NEW YORK.

PRODUCTION OF AMMONIA.

1,354,574. Specification of Letters Patent. Patented Oct. 5, 1920.

No Drawing. Application filed October 15, 1918. Serial No. 258,157.

*To all whom it may concern:*

Be it known that I, FLOYD J. METZGER, a citizen of the United States, residing at New York city, in the county of New York, State of New York, have invented certain new and useful Improvements in the Production of Ammonia; and I do hereby declare the following to be a full, clear, and exact description of the invention, such as will enable others skilled in the art to which it appertains to make and use the same.

This invention relates to an improved method of producing ammonia from cyanids.

In the production of cyanids it has heretofore been proposed to make use of catalytic agents, such as metallic iron, in relatively large amount, for example, in amount ranging from about one-third of the total furnace charge to about 40% thereof, and the remainder of the furnace charge being made up of carbonaceous material and soda.

I have found that such large amounts of iron are not necessary for the production of cyanid, and that improved results are obtainable when but a small amount of iron is employed, for example, about 2% of iron, in the form of a readily reducible iron compound such as iron ore (oxid); and the process in which such small amounts of iron are employed forms the subject-matter of separate applications.

In the treatment of a cyanid furnace product, containing iron, with steam or water for the conversion of the cyanid into ammonia, the presence of iron is objectionable for the reason that it will react, in the presence of water, with the cyanid, or with hydrocyanic acid formed therefrom, with the resulting production of ferro-cyanid and, to the extent that ferro-cyanid is formed, the amount of ammonia formed is correspondingly reduced. Even small amounts of iron have a pronounced effect upon the amount of ammonia produced when water is present during the production. Thus one atomic proportion of iron will require six molecular proportions of the cyanid for the formation of sodium ferro-cyanid; or, otherwise stated, 1% of iron will fix about $5\frac{1}{4}\%$ of sodium cyanid as ferro-cyanid.

The present invention provides for the recovery of ammonia from cyanid furnace products without the formation of any objectionable amount of ferro-cyanid, even where the cyanid furnace product contains iron in relatively large amount, so that the ammonia is obtained without any objectionable diminution in its yield, and so that the iron is left in the residue in a form available for return to the cyanid process and for use therein.

According to the present invention, the cyanid furnace product is treated with dry steam at a temperature below that of decomposition of the ammonia formed, and at a temperature such that the formation of water of condensation is prevented, so that the steam will remain dry, and the furnace product will remain dry, during the ammonia production. The upper limit will thus be below about 500° C. and preferably the furnace product should be materially below this limit. The lower limit will be such a temperature as will prevent the condensation of any appreciable amount of water from the steam employed.

If the cyanid furnace product is treated with steam at a temperature which is below the temperature of decomposition of sodium formate, the production of sodium formate will take place at the same time that the ammonia is set free, and the sodium formate will remain in the dry residue and can be extracted therefrom, or it can be left in the residue and returned for use in the further production of cyanid.

The following more detailed description will further illustrate the practice of the invention.

The cyanid-producing operation is carried out with a furnace charge made up of about 44 parts of soda ash, 54 parts of coke, and 2 parts of iron (in the form of oxid). This furnace charge is finely ground in a ball mill and is then subjected to the action of nitrogen or a nitrogen-containing gas, at a temperature appropriate to the formation of sodium cyanid,—for example, at a temperature of around 850 to 1100° C. and preferably between 1000 and 1100° C. The treatment may, with advantage, be carried out in a rotary furnace and in accordance with the process described and claimed in my prior application Serial No. 222,812, filed March 16, 1918, for example, in a rotary furnace of about 15 inches diameter, inclined at an angle of about 10°, and having a length of about 10 ft. in the furnace zone, and made of a material such as an alloy of nickel, chromium and iron which is resistant to the furnace atmosphere and to the ingredients of the charge. When such a rotary furnace is filled with the charge and is rotated at a rate of about one revolution per minute, the constituents of the charge will be thoroughly intermingled during the introduction of the nitrogen, and a product in granular form, can be obtained. The nitrogen may be obtained from any suitable source such as from a liquid air apparatus which provides nitrogen of from 99.5 to 99.9% purity, and it may be introduced at a rate of about two cubic feet per minute. The treatment of the furnace charge with the nitrogen is continued for a proper period of time, for example, for about eight or nine hours, or until the cyanid production has progressed to the desired extent.

The cyanid furnace product thus produced will usually contain unconverted sodium carbonate, and also sodium oxid, in varying amount. It will also contain unconverted carbonaceous material, and it will, of course, contain the sodium cyanid formed. It will also contain the iron employed as a catalytic agent, in a highly reactive form.

If such a furnace product is digested with water under pressure, or is treated with moist steam, or with steam under such conditions that condensation of water will take place, the ferro-cyanid formation above referred to will take place. According to the present invention, this ferro-cyanid production is substantially or entirely prevented by the employment of dry steam at an elevated temperature so that formation of water by condensation is prevented, and so that a dry furnace product is obtained. The temperature should, as above noted, be below that of decomposition of the ammonia so that loss of ammonia will be avoided.

The furnace product can thus be cooled, either in a prolongation of the furnace chamber beyond the heating zone or in a separate receptacle, to a temperature which is below that of decomposition of the ammonia; and the product can then be treated with dry steam for the production of the ammonia. If the temperature is also below that of decomposition of sodium formate, it will also be formed and will remain in the dry residue. The treatment of the furnace product with steam can be effected continuously, or intermittently. The steam can thus be introduced in a dry state and at an increased pressure and corresponding temperature, and the steam supply then shut off while the formation of ammonia is permitted to take place. After the ammonia has thus been permitted to form, and has been removed, a further amount of steam may be admitted and a further production of ammonia permitted to take place, and this treatment can be repeated until substantially all of the cyanid has been converted into ammonia.

The residue remaining after the production of ammonia will contain substantially all of the original alkali employed in the furnace charge, for example, in the form of sodium carbonate, sodium formate, sodium oxid, etc. If the temperature of formation of the ammonia is below that of decomposition of sodium formate, the product will contain the sodium formate, admixed with any unconverted sodium carbonate and with varying amounts of sodium hydroxid. If a higher temperature is employed, the alkali will be present, for example, largely as sodium carbonate and sodium oxid. This furnace product will also contain the iron originally employed in the furnace charge and, inasmuch as the formation of ferrocyanid has been largely, if not entirely, prevented, this iron will be in a form available for return to the cyanid process and further use therein.

This residue can accordingly, with advantage, be returned to the cyanid furnace charge and used again therein, and a corresponding economy in the cyanid production can be thereby effected inasmuch as it will be necessary to add only such further quantity of reagents as will rectify the composition of the charge, for example, such small amounts of alkali as may be lost in the process, and further amounts of carbonaceous material, etc. The residue can thus be returned repeatedly to the cyanid furnace until its accumulation of impurities from the ash of the carbonaceous material renders further return unprofitable.

If sodium formate is formed at the same time that the production of ammonia takes place, the formate may, with advantage, be leached from the residue in accordance with the process described and claimed in my companion application Serial No. 252832 filed Sept. 6, 1918 so that there will remain in the residue the unconverted sodium carbonate together with the unconverted carbonaceous material and the iron. This residue can then be returned to the cyanid process and its alkali content, as well as its content of iron and carbonaceous material, made available for further use in the manner similar to that above described. I do not, however, claim specifically herein the specific process described and claimed in said companion application, although I regard such process, so far as it relates to the combined production of ammonia and formates in accordance with the process herein described, as within the more comprehensive aspects of the present invention, and as included within the more comprehensive claims appended hereto.

Where the extraction and recovery of the formate is not to be effected, the maintenance of a temperature below that of decomposition of the formate is not of so great importance, although such amounts of formate as are formed can be returned to the cyanid process and its alkali content further utilized. The furnace product may thus be cooled below the temperature of decomposition of ammonia and then treated with dry steam of a lower temperature, so that the temperature of the product will be lowered by the steam while the ammonia formation is taking place, and so that, accordingly, the initial formation of ammonia will take place at a higher temperature than that of the later ammonia formation which may be at about the temperature of the steam employed, and at a temperature such that more or less formate will also be formed.

I claim:

1. The method of improving the production of ammonia from cyanid furnace products containing iron, which comprises subjecting such furnace product to the action of dry steam at a temperature above that of condensation of the steam and below 500° C., whereby any material loss of ammonia by the formation of ferro-cyanid is prevented.

2. The method of improving the production of ammonia from cyanid furnace products containing iron, which comprises subjecting such furnace product to the action of dry steam at a temperature above that of condensation of the steam and below 500° C., whereby any material loss of ammonia by the formation of ferro-cyanid is prevented, and returning the residue with its content of alkali and iron for further use in the production of cyanid.

3. The method of improving the production of ammonia from cyanid furnace products containing iron, which comprises cooling such furnace products from the temperature of the cyanid formation to a temperature below 500° C., subjecting such furnace products while still at an elevated temperature to the action of dry steam of a lower temperature, and thereby cooling the product and effecting the production of ammonia therefrom without any material formation of ferro-cyanid.

In testimony whereof I affix my signature.

FLOYD J. METZGER.